US010882556B2

(12) United States Patent
Van Deventer et al.

(10) Patent No.: US 10,882,556 B2
(45) Date of Patent: Jan. 5, 2021

(54) BUSHING AND A SUSPENSION ASSEMBLY

(71) Applicant: Cruisemaster Australia Pty Ltd, Geebung (AU)

(72) Inventors: Deon Van Deventer, Brisbane (AU); Brayden Minetto, Brisbane (AU)

(73) Assignee: Cruisemaster Australia Pty Ltd, Geebung (AU)

( * ) Notice: Subject to any disclaimer, the term of this patent is extended or adjusted under 35 U.S.C. 154(b) by 74 days.

(21) Appl. No.: 15/886,585

(22) Filed: Feb. 1, 2018

(65) Prior Publication Data

US 2018/0215414 A1     Aug. 2, 2018

(30) Foreign Application Priority Data

Feb. 1, 2017  (AU) ................................ 2017900296

(51) Int. Cl.
*B62D 17/00*     (2006.01)
(52) U.S. Cl.
CPC ........ *B62D 17/00* (2013.01); *B60G 2200/132* (2013.01); *B60G 2200/46* (2013.01); *B60G 2200/4622* (2013.01); *B60G 2204/143* (2013.01); *B60G 2204/61* (2013.01)
(58) Field of Classification Search
CPC ............ B62D 17/00; B60G 2200/4622; B60G 2200/46; B60G 2200/132; B60G 2200/462; B60G 2204/61

USPC ..................................... 280/86.756, 86.754
See application file for complete search history.

(56) References Cited

U.S. PATENT DOCUMENTS

| 2,198,544 | A | * | 4/1940 | Leighton | B62D 17/00 |
| | | | | | 403/118 |
| 4,582,229 | A | * | 4/1986 | Wolf | A01C 7/12 |
| | | | | | 222/282 |
| 8,075,005 | B1 | * | 12/2011 | Ryshavy | B60G 7/02 |
| | | | | | 280/86.754 |
| 2005/0280229 | A1 | * | 12/2005 | Ingalls | B62D 17/00 |
| | | | | | 280/86.756 |
| 2007/0096418 | A1 | * | 5/2007 | Houser | B60G 7/008 |
| | | | | | 280/86.751 |
| 2016/0308409 | A1 | * | 10/2016 | Takahashi | H02K 21/46 |

* cited by examiner

*Primary Examiner* — Keith J Frisby
(74) *Attorney, Agent, or Firm* — Workman Nydegger

(57) ABSTRACT

A bushing for an independent suspension assembly, said suspension assembly being adapted to pivot relative to a trailer or a vehicle frame, the bushing comprising: a sleeve body having a substantially cylindrical outer surface for engaging the suspension assembly; and an inner bore of the sleeve body extending along a first longitudinal axis, said first axis being eccentrically disposed with respect to a second longitudinal axis of the cylindrical outer surface; wherein during use the bore is adapted for engaging a spindle and allowing the suspension assembly to pivot relative to the spindle.

9 Claims, 9 Drawing Sheets

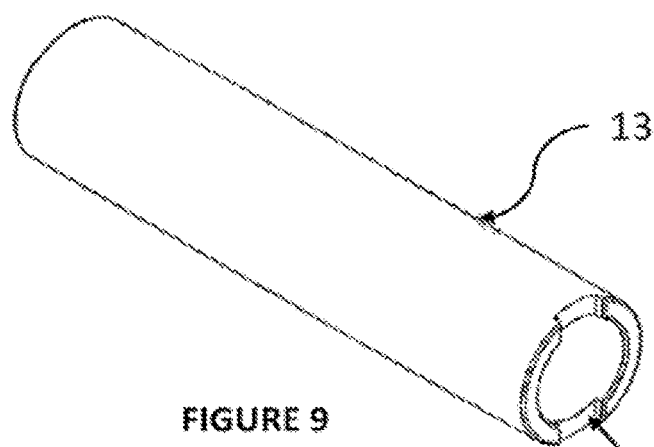
FIGURE 9
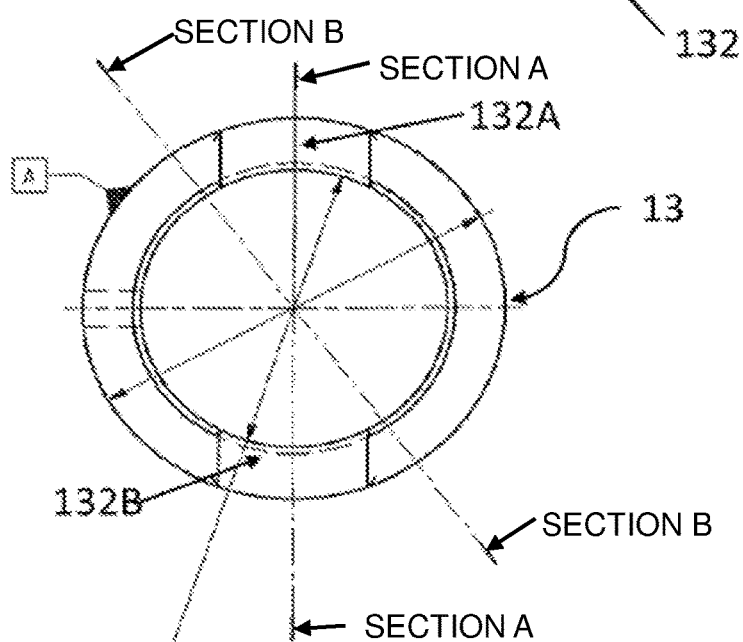
FIGURE 10
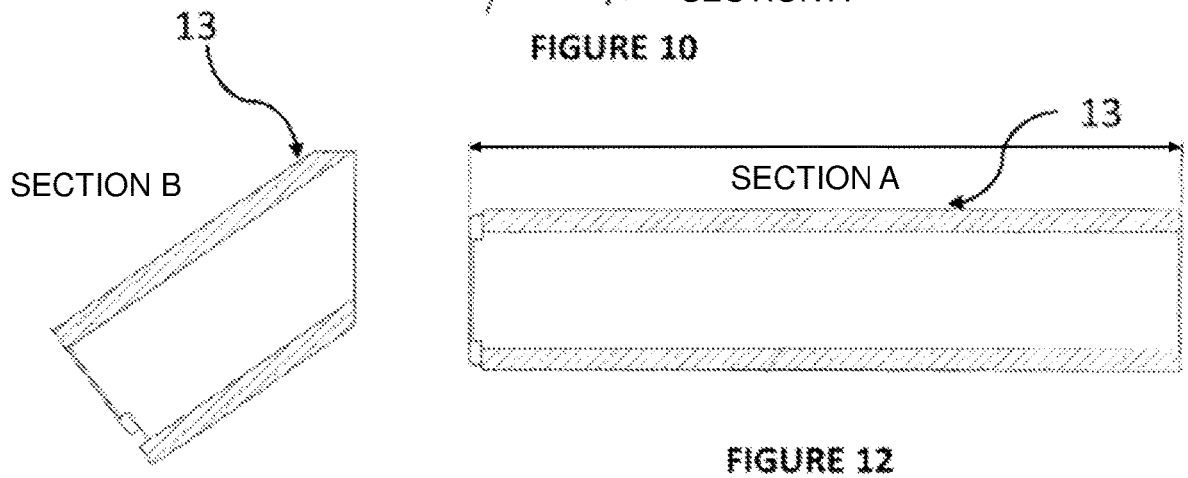
FIGURE 11
FIGURE 12

BUSHING AND A SUSPENSION ASSEMBLY

RELATED APPLICATIONS

This application claims priority to Australian Application No. 2017900296 entitled "A Bushing and a Suspension Assembly" filed on Feb. 1, 2017, the contents of which are herein incorporated by reference in their entirety.

TECHNICAL FIELD

The present invention is directed to a bushing and a suspension assembly.

BACKGROUND

Any references to methods, apparatus or documents of the prior art are not to be taken as constituting any evidence or admission that they formed, or form part of the common general knowledge.

Suspension assemblies for vehicles must meet a number of conflicting requirements. Independent suspension assemblies for vehicles such as box trailers and caravans have been known in the past. One such suspension assembly has been described in the present applicant's previously published Australian Standard Patent Application No. 2014202238 and shown in FIG. 1.

Referring to FIG. 1, the suspension assembly 1 comprises a trailer mounting subassembly 21 which comprises spaced hinge side plates 10a, 10b. A hinge bar 6 spans between and interconnects the hinge side plates in order to impart rigidity to the trailer mounting subassembly. Opposite ends of the hinge bar 6 are received into complementary slots formed into upper ends of the side plates and welded thereto. In use the hinge bar 6 is welded or otherwise fastened to a member of a vehicle, such as a cross bar (not shown). The hinge bar 6 in combination with the independent side plates 10a and 10b allows the suspension assembly 1 to be pivotally supported.

The independent hinge side plates 10a, 10b support a rotatable hinge tube assembly 13 that comprises a square cross section hinge tube 11. The hinge tube 11 is supported between the side plates 10a, 10b by an elongate member, in the form of a rod or "hinge spindle" (not shown) that extends through the hinge tube 11.

Camber angle is the measure in degrees of the difference between the wheels vertical alignment perpendicular to the surface. If a wheel is perfectly perpendicular to the surface, its camber would be 0 degrees. Toe-in defines the angle of the wheel in the direction of travel. When both front wheels are aimed straight ahead and the distance between the leading edges of both front tires is exactly the same as the distance between the trailing edges, the wheels have "zero toe" and are theoretically aligned. Toe-in means the front edges of the tires are closer together than the rear edges. Toe-out is when the front edges of the tires are farther apart than the rear edges. FIG. 1 also describes a camber and toe-in adjustment mechanism that can be provided at either end of the hinge spindle. The camber adjustment mechanism includes a cam 17, which is a disk mounted eccentrically to the end of the hinge spindle 12 (shown in FIG. 2). The cam 17 abuts an internal wall of a hole formed through the corresponding hinge side wall 10a or 10b. Cam 17 is formed with peripheral formations, e.g. indentations and/or protrusions which complement a ring (not shown) in the head of an adjustment wrench. Accordingly by rotating the cam the angle of the hinge tube 11, and so also the suspension arm 16, can be adjusted relative to the side plates. Once in a desired position the nut is tightened on the opposite end of the spindle, about which it is threaded, in order to retain the cam in the desired position. The applicants have found that installation of the camber adjustment mechanism in the suspension assembly of the prior art (as shown in FIG. 1) is particularly difficult during installation. The currently available prior art system allows for toe-in to be adjusted by using the cam mechanism as explained above. However, if camber adjustment is also required, such adjustment is performed by rotating a square bush with a hole at the other end of the hinge tube 11. In such an example, toe-in and camber adjustment arrangements may also be swapped so that camber adjustment is provided by the cam and toe-in adjustment is provided by the bush. A limitation associated with the prior art arrangement is that the square bush of the prior art requires a square tube to be used so that the square tube can be fitted into one of only four positions. Square tubes are generally not built to tight tolerances and so a range of bushes having differing sizes need to be used to ensure that the clearance of the bush is kept to a minimum.

In view of the above problems, it is desirable to provide an improvement in providing camber to wheels of a vehicle such as a trailer.

SUMMARY OF THE INVENTION

In a first aspect, the invention provides a bushing for an independent suspension assembly, said suspension assembly being adapted to rotate relative to a trailer or a vehicle frame, the bushing comprising:

a sleeve body having a substantially cylindrical outer surface for engaging the suspension assembly; and an inner bore of the sleeve body extending along a first longitudinal axis, said first axis being eccentrically disposed with respect to a second longitudinal axis of the cylindrical outer surface;

wherein during use the bore is adapted for engaging a spindle and allowing the suspension assembly to rotate relative to the spindle.

In a second aspect, the invention provides an independent suspension assembly comprising:

a connecting subassembly for attachment to the vehicle or trailer frame;

a cylindrical member arranged for pivotal movement relative to the connecting subassembly;

a suspension arm extending in a transverse direction relative to the cylindrical member;

a stub axle extending laterally from the suspension arm;

a shock absorbing subassembly positioned relative to the suspension arm; and a bushing for providing wheel camber or toe-in adjustment in the vehicle or trailer during use, the bushing further comprising:

a sleeve body having a substantially cylindrical outer surface for engaging the cylindrical member; and an inner bore of the sleeve body extending along a first longitudinal axis, said first axis being eccentrically disposed with respect to a second longitudinal axis of the cylindrical outer surface;

wherein during use the bore is adapted for engaging a spindle and allowing the cylindrical arm to pivot relative to the spindle.

In an embodiment, the cylindrical outer surface is adapted for engaging a cylindrical member, preferably a hollow cylindrical member of the suspension assembly.

Preferably, the cylindrical outer surface is adapted for engaging inner surface of the cylindrical member.

In an embodiment, the bushing comprises a circumferential collar adapted for engagement with the suspension assembly.

Preferably, the collar comprises a raised profile relative to the cylindrical outer surface.

In an embodiment, the collar is adapted for engagement with cylindrical member.

In an embodiment, the bushing further comprises one or more engagement portions for engaging and interlocking the collar relative to the cylindrical member.

In an embodiment, the one or more engagement portions comprises one or more projections circumferentially arranged relative to the cylindrical outer surface.

In an embodiment, the projections are adapted for being positioned in corresponding recessed portions of the cylindrical member.

In another aspect the invention provides a bushing for an independent suspension assembly, said suspension assembly being adapted to rotate relative to a trailer or a vehicle frame, the bushing comprising:

a sleeve body having a substantially cylindrical outer surface for engaging a cylindrical member of the suspension assembly; and an inner bore extending through the sleeve body wherein during use the bore is adapted for engaging a spindle and allowing the suspension assembly to pivot relative to the spindle;

the sleeve body comprising a circumferential collar positioned at an end portion of the sleeve body, the collar comprising one or more engagement portions for engaging and interlocking the collar relative to the cylindrical member to prevent rotation of the bushing relative to the cylindrical member.

In an embodiment, the engagement portions comprise one or more chamfered edges for engaging the cylindrical member, the cylindrical member.

In an embodiment, the collar comprises circumferentially or spirally arranged slots or grooves for allowing flow of lubricant there-along.

In an embodiment, the inner bore comprise spirally arranged grooves extending along the internal surface of the inner bore, the spirally arranged grooves being provided for allowing flow of lubricant therethrough In an embodiment, the bushing further comprises indicators for aligning the sleeve body relative to the cylindrical body and/or the spindle and positioning the suspension assembly at a predetermined camber and/or toe.

In an embodiment, the sleeve body comprises a first end and a second end such that the collar is located at one of said first or second ends for engagement with a connector attached to the trailer or vehicle frame and wherein the second end, during use, is adapted for being located within an internal volume defined by the hollow cylindrical member.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 9 is a perspective view of the hinge tube 13.

FIG. 10 is an end view of the hinge tube 13.

FIG. 11 is a first sectional view of the hinge tube 13 along section B-B (shown in FIG. 10).

FIG. 12 is a second sectional view of the hinge tube 13 along section A-A (shown in FIG. 10).

DETAILED DESCRIPTION OF PREFERRED EMBODIMENTS

Figure 1:
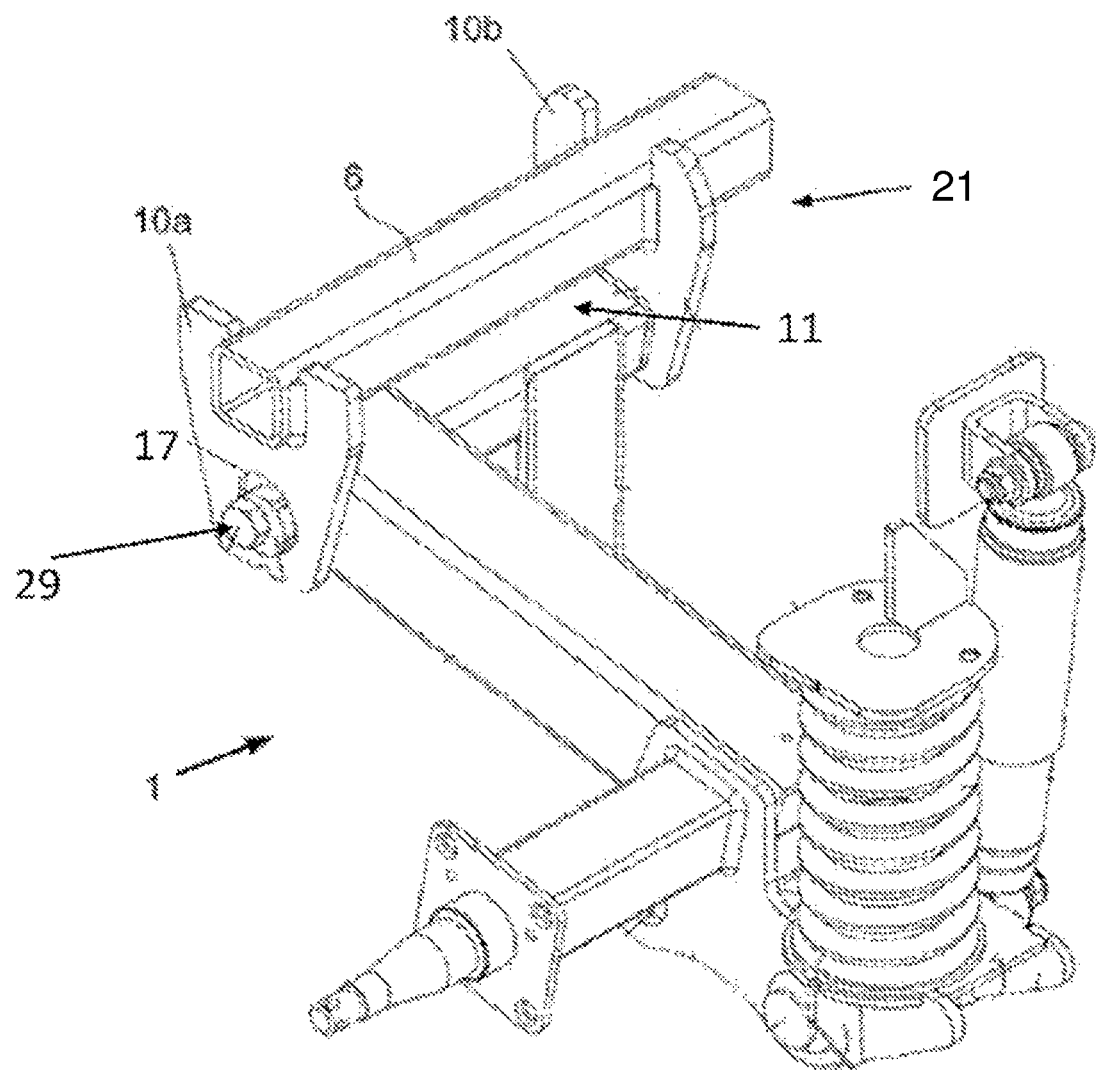
FIG. 1 is a perspective view of an independent suspension assembly known in the prior art.
Figure 2:
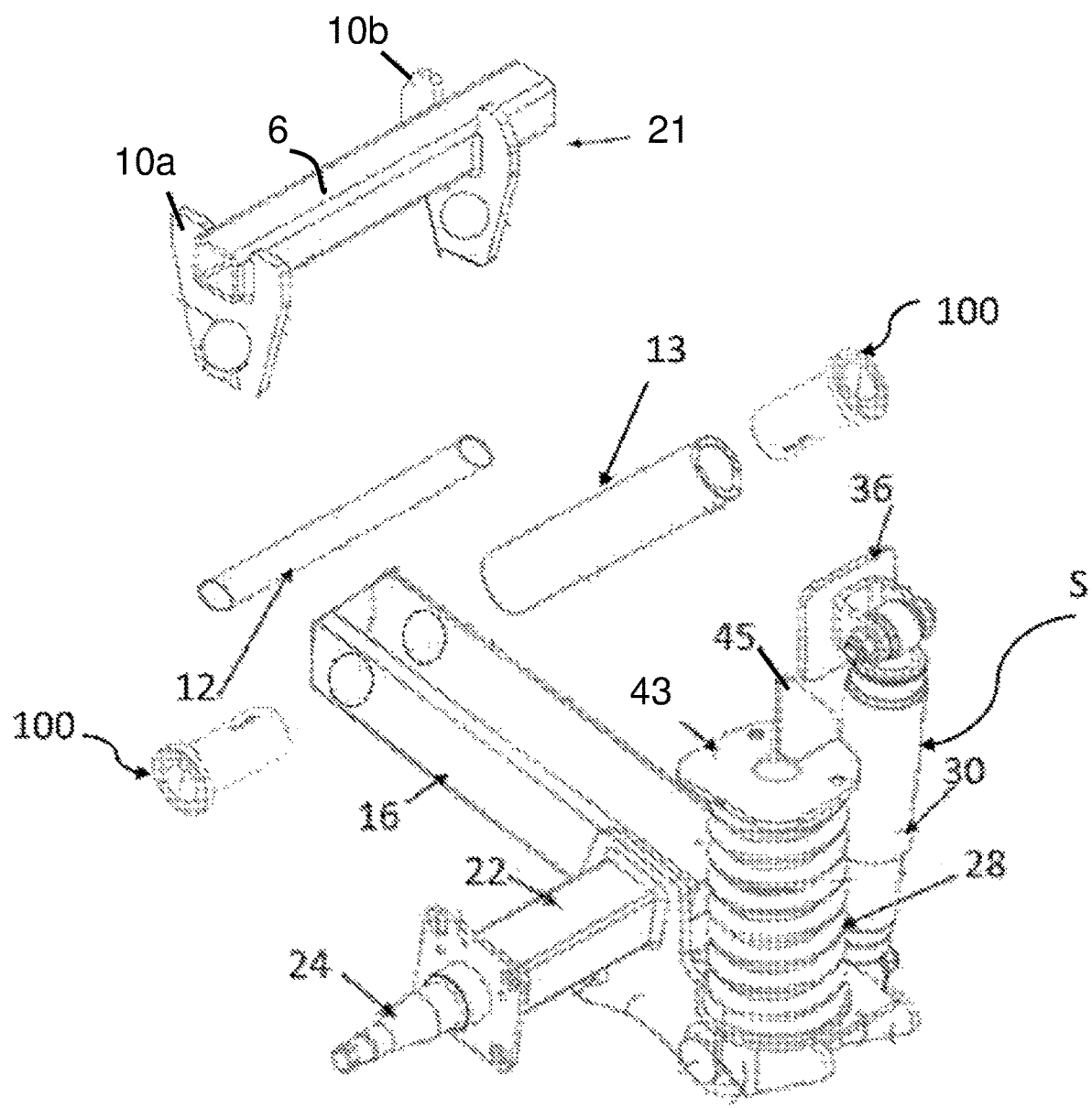
FIG. 2 is an exploded-perspective view of a bushing 100 in conjunction with an independent suspension assembly S in accordance with an embodiment of the invention.
Figure 3:
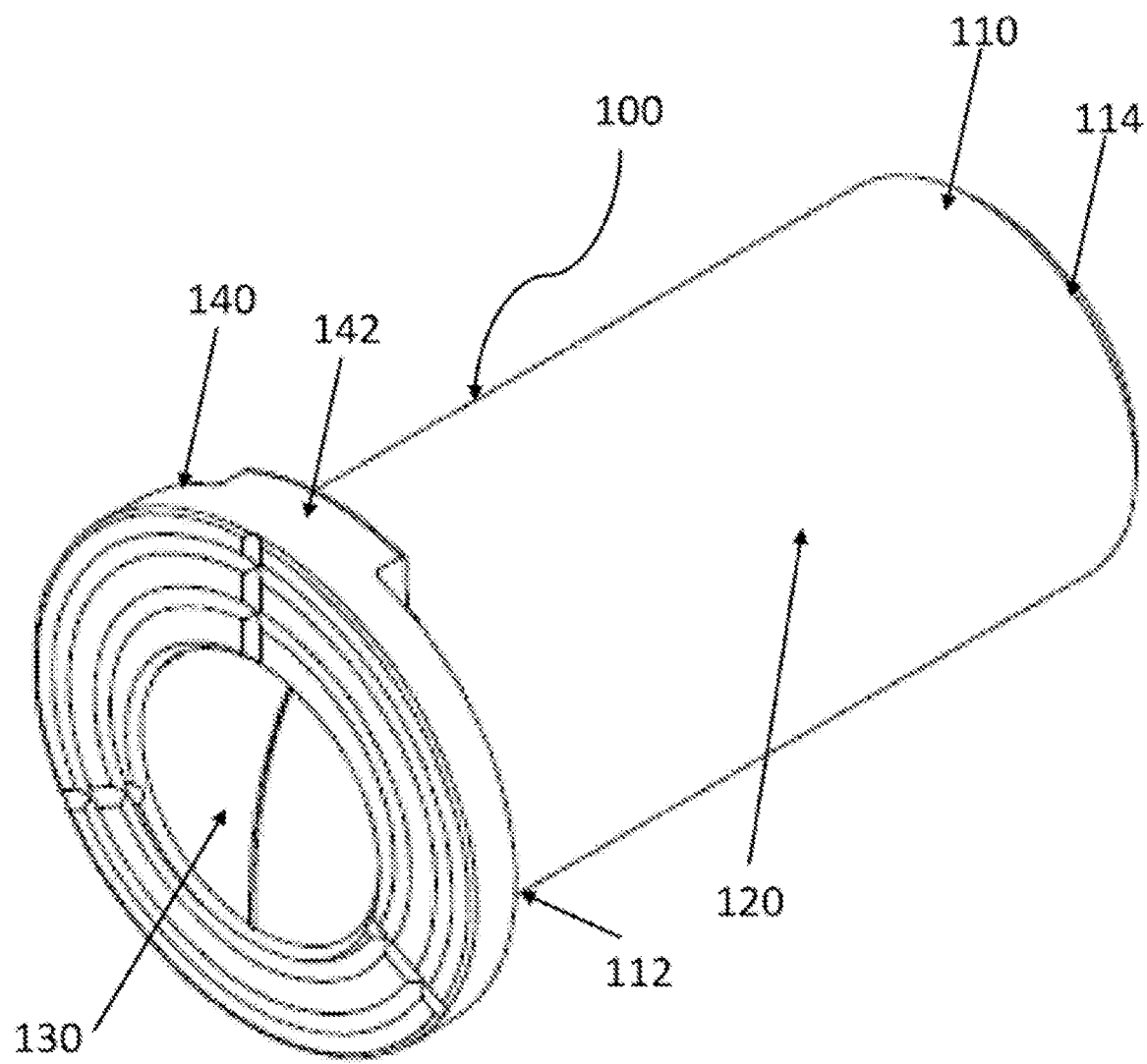
FIG. 3 is perspective view of the bushing 100.
Figure 4:
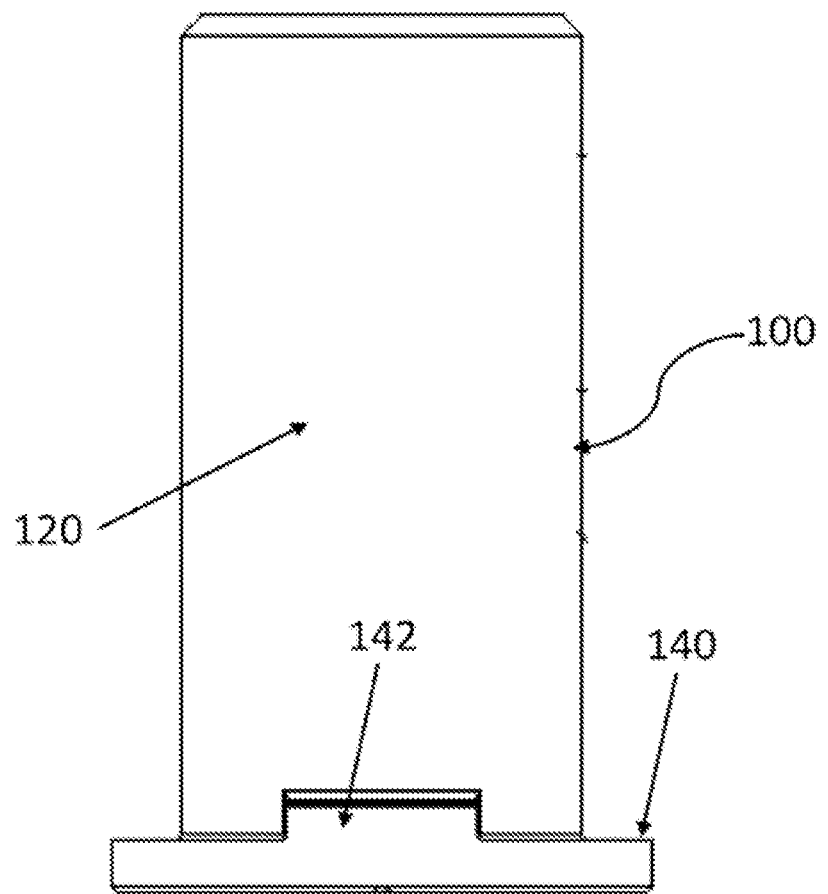
FIG. 4 is a side view of the bushing 100.

Like reference numerals denote features that have been previously described in relation to FIG. 1. Referring to FIG. 2, the suspension assembly S comprises a trailer mounting subassembly 21 which comprises spaced hinge side plates 10a, 10b. A hinge bar 6 spans between and interconnects the hinge side plates in order to impart rigidity to the trailer mounting subassembly. Opposite ends of the hinge bar 6 are received into complementary slots formed into upper ends of the side plates and welded thereto. In use the hinge bar 6 is welded or otherwise fastened to a member of a vehicle, such as the cross bar (not visible in FIG. 2) of a trailer, to which the independent suspension assembly S is installed.

The hinge side plates 10a, 10b support a rotatable hinge tube 13 between them. In the presently described exemplary embodiment the hinge tube 13 is comprised of a substantially cylindrical cross section.

The hinge tube 13 is supported between the side plates 10a, 10b by an elongate member, in the form of a rod or "hinge spindle" 12. The "hinge spindle" 12 is received into a hollow internal volume defined by the hinge tube 13. During use, the spindle 12 extends through the hinge tube 13.

A suspension arm 16 extends from the hinge tube 13. The suspension arm 16 may be fastened to the hinge tube 13 by way of any fastening arrangement such as welding to prevent any relative movement between the hinge tube 13 and the suspension arm 16. In the presently described embodiment, the suspension arm 16 is formed with a passage at one end through which the hinge tube 13 snugly passes and about which it is welded to the suspension arm 16. A diagonal oriented stiffening member (not shown) may also be connected between the hinge tube 13 and the suspension arm 16 in order to counteract sideways forces exerted on the suspension arm 16 in use.

Figure 5:
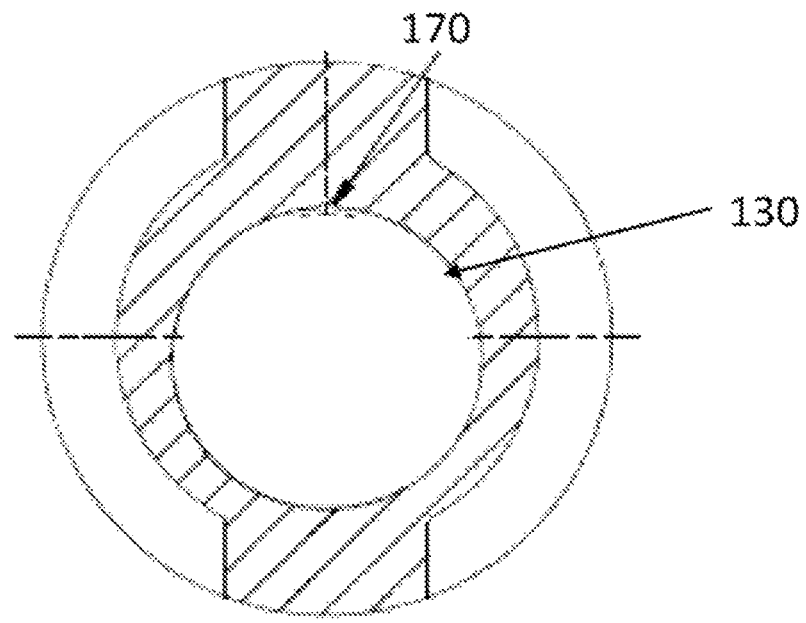
FIG. 5 is a first end view of the bushing 100.
Figure 6:
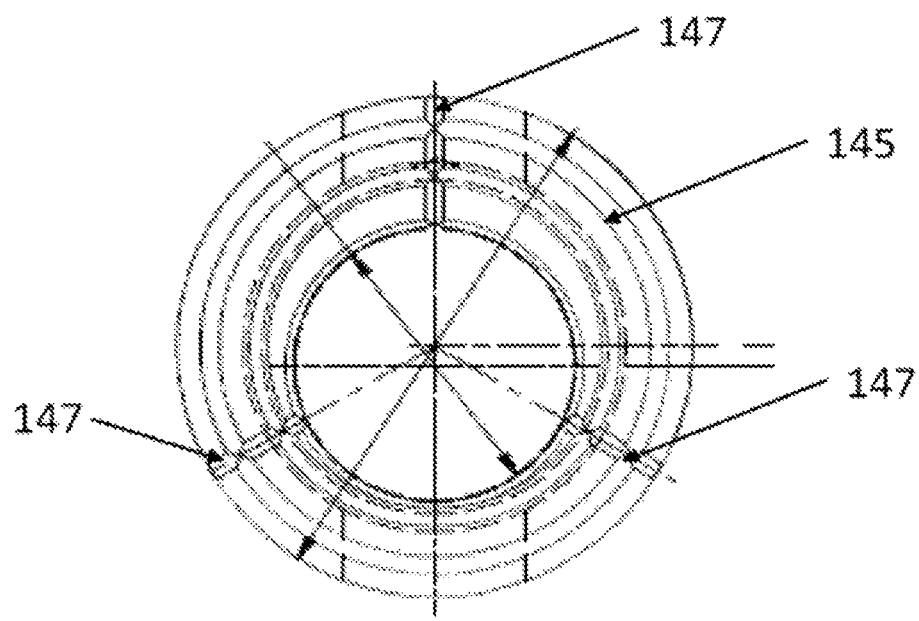
FIG. 6 is a second end view of the bushing 100.

A bush 100 is arranged at either end of the hinge spindle 12 and allows the suspension assembly S to pivot relative to the spindle 12. Referring to FIGS. 3 to 7, detailed illustrations of the bush 100 are shown. The bush 100 comprises a sleeve body 110 having a substantially cylindrical outer surface 120 for engaging an inner surface of the hinge tube 13. The sleeve body 110 comprises an inner bore 130 extending along a first longitudinal axis. The inner bore 130 of the bush 100 is sized for engaging the spindle 12 during use. The first longitudinal axis of the inner bore 130 is eccentrically disposed with respect to a second longitudinal axis of the cylindrical outer surface 120 (as best shown in FIGS. 5 and 6). As a result, the inner bore 130 is positioned in an off-center configuration relation to a central axis of the sleeve body 110.

The bush 100 is provided to engage the suspension assembly S (by way of engaging the cylindrical hinge tube 13—See FIG. 2) along its outer cylindrical surface 120 and the spindle 12 (along the inner bore which is eccentrically disposed) to allow the suspension assembly S to pivot about the spindle 12. Advantageously, providing the inner bore 130 in the aforementioned eccentric configuration provides an in-built camber within the bushing 100 and thereby assists in providing camber or toe to the wheels of the vehicle or trailer during use.

The sleeve body 110 extends between a first end 112 and a second end 114. A collar 140 is provided at the first end 112 of the sleeve body 110 to engage with the respective hinge plates 10a and 10b attached to the trailer or vehicle frame (as shown in FIG. 2). The second end 114 of the bushing 100 is located within an internal volume defined by the hinge tube 13. Referring to FIGS. 3 to 12, the collar 140 comprises a raised profile relative to the cylindrical outer surface 120 and allows the bushing to engage and interlock with the hinge tube 13 (best shown in FIGS. 8 to 12). Specifically, the collar 140 includes circumferentially arranged engagement portions 142 that project outwardly from the cylindrical outer surface 120. The engagement portions 142 are configured for being received and retained within recesses 132A and 132B that are provided at a connecting end of the hinge tube 13. The engagement portions 142 are provided with chamfered edges that abut corresponding edge portions of the recesses 132.

Figure 8:
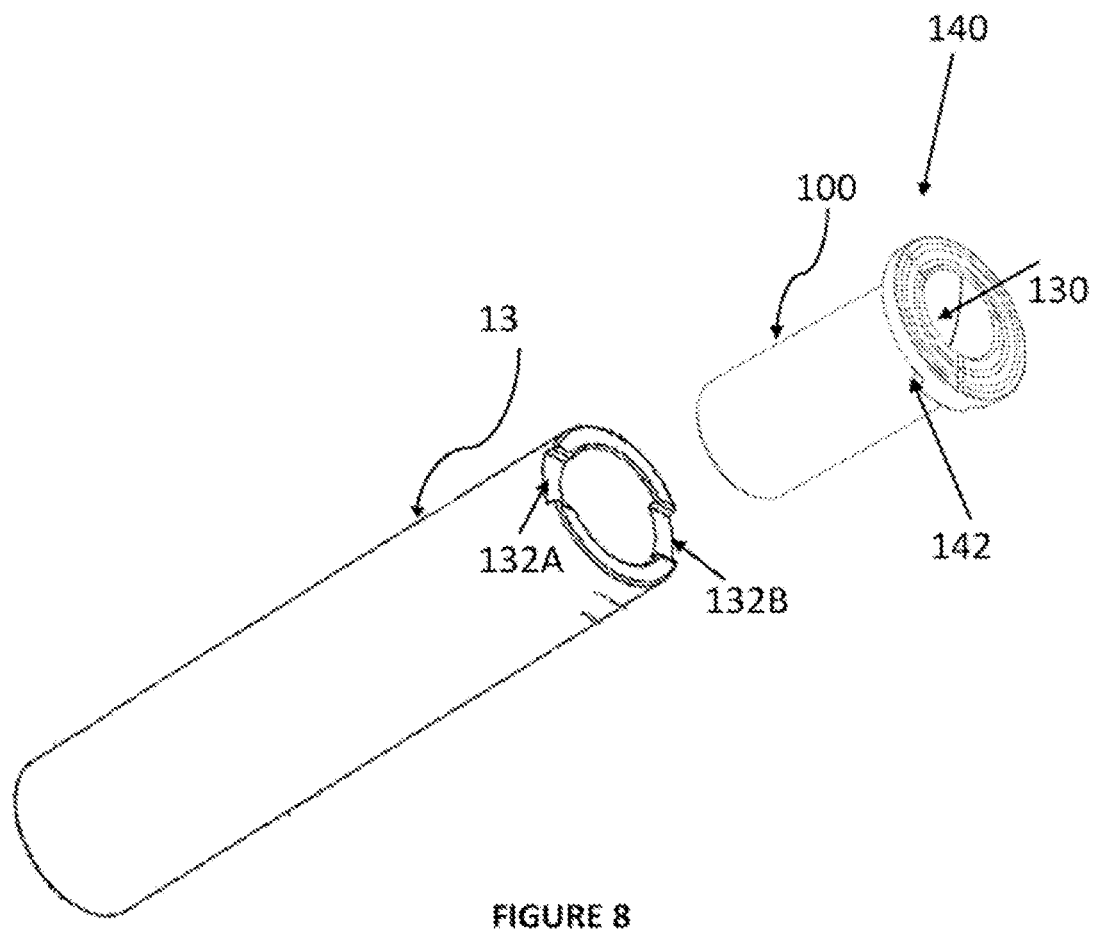
FIG. 8 is an exploded perspective view of the bushing 100 in conjunction with the hinge tube 13.
Figure 13:
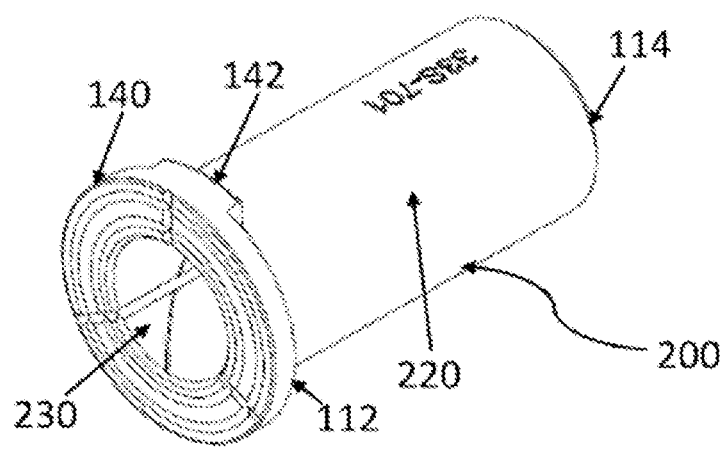
FIG. 13 is a perspective view of another embodiment of a bushing 200 in accordance with a second embodiment.
Figure 14:
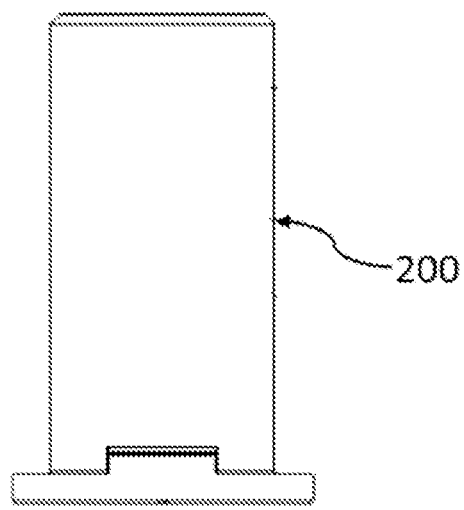
FIG. 14 is a side view of the bushing 200.
Figure 15:
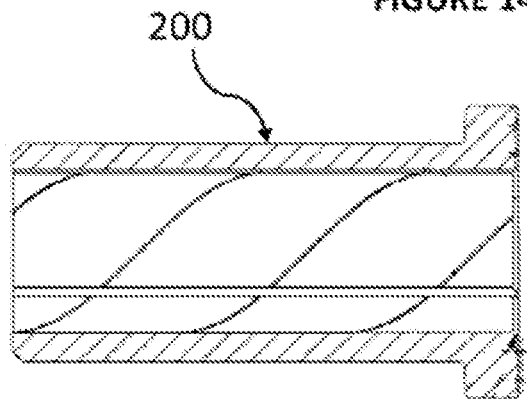
FIG. 15 is a sectional view of the bushing 200
Figure 16:
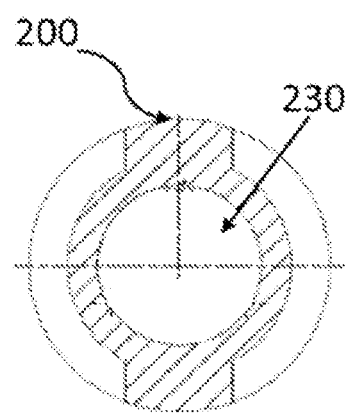
FIG. 16 is an end view of the bushing 200.

Referring to FIG. 8, the circumferential arrangement of the engagement portions 142 allows the bushing 100 to be connected so that the slightly off-center or eccentric inner bore 130 of the bushing 100 is aligned relative to the suspension assembly S (specifically the hinge tube 13) to impart an increase or decrease in the camber or toe-in to achieve a predetermined inclination of camber or toe-in. The mounting orientation of the bushing 100 may be varied to effect camber or toe-in simultaneously.

During use, in a first operating configuration, the engagement portion 142 may be positioned and retained into the first recess 132A of the hinge tube 13 to provide a first angle of inclination between vertical plane of the wheel and the surface (upon which the wheel is positioned during use).

In a second alternative operating configuration, the engagement portion 142 may be positioned and retained into the second recess 132B to provide a second angle of inclination whilst providing camber. Therefore, the bushing 100, in at least some embodiments, also allows installers to adjust the camber imparted to the trailer or the vehicle by varying the angle of inclination by interchanging the engagement position of the engagement portion 142 relative to the connecting portion of the hinge tube 13.

The angle of inclination in both operating configurations is varied by varying the relative position of the inner bore 130 that is slightly off center relative to the outer cylindrical surface 130 of the sleeve body 110.

In other alternative embodiments, a plurality (more than two—not shown) circumferentially arranged recesses 132 may be provided along the connecting end of the hinge tube 13 to allow installers to adjust or vary the angle of inclination whilst providing camber. In some embodiments, visual indicators or markings may also be provided around the hinge tube 13 and/or the collar 140 of the bushing 100 to align the bushing 100 and achieve a predetermined camber which corresponds to the indicators or markings provided on the hinge tube 13 and/or the bushing 100.

Figure 7:
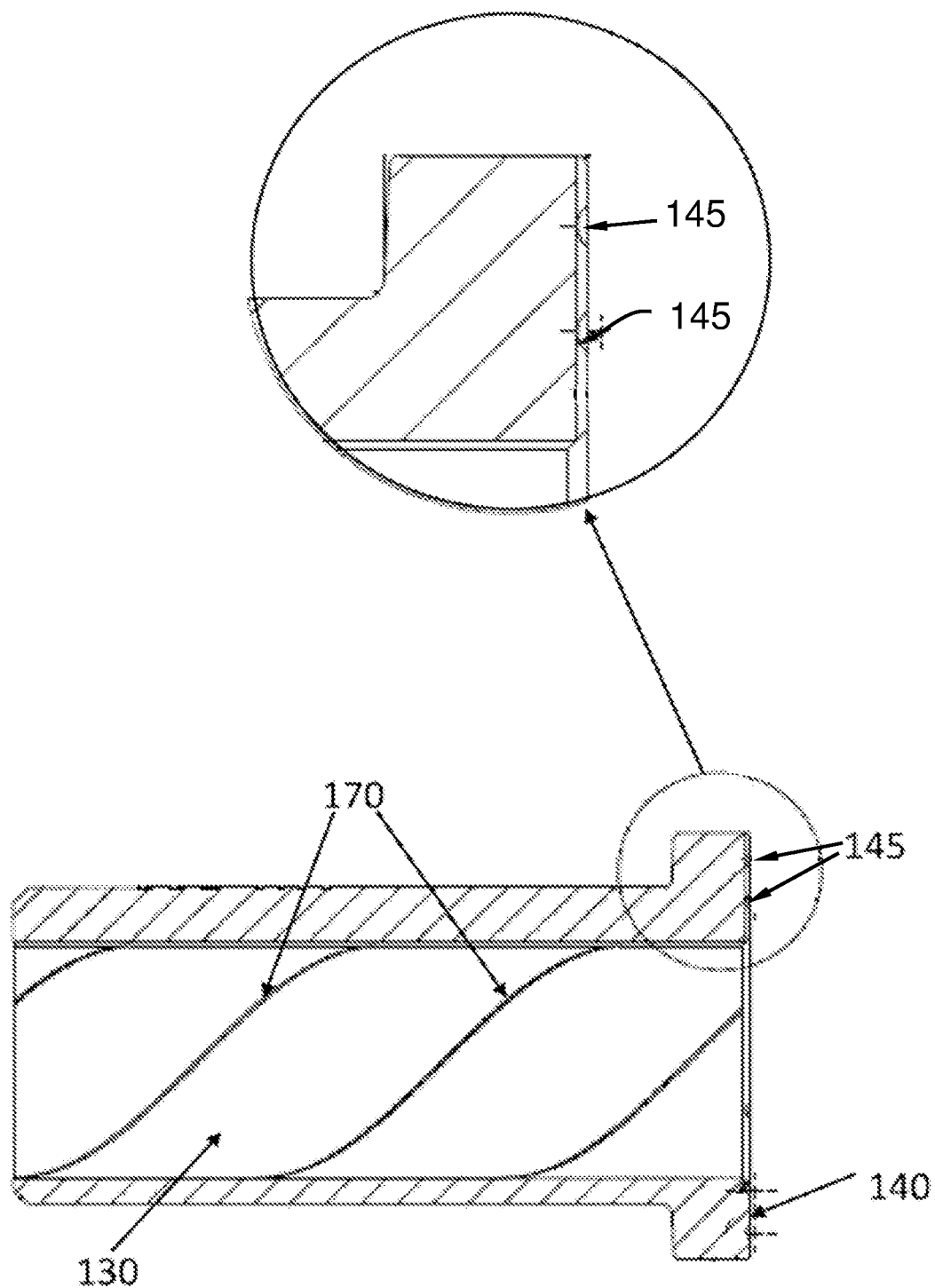
FIG. 7 is a sectional view of the bushing 100.

Referring to FIG. 7, the collar 140 also comprises circumferentially arranged (annular) slots or grooves 145 for allowing flow of lubricant such as grease in order to lubricate the contacting regions (to reduce friction between the hinge plates 10a, 10b and the respective collars 140 of each corresponding bushing 100—shown in FIG. 2) around the collar 140, during use. Flanges 147 are provided along the flow path of the grease slots 145 for directing and retaining the lubricant within the slots 145. The inner bore 130 may also comprise helical or spiral grease grooves 170 provided along an interior surface of the inner bore for providing lubrication in between the interior surface and the spindle 12 during use.

Referring to FIGS. 13 to 16, another embodiment of the bushing 200 is illustrated. Like reference numerals denote like features which have been previously described. The only difference between the previously described bushing 100 and the bushing 200 relates to the structure of the inner bore 230 that extends through the sleeve body 110. Specifically, the inner bore 230 is formed concentrically with the sleeve body 110. In other words, the inner bore 230 is not off-centre unlike the inner bore 130 of bushing 100.

In compliance with the statute, the invention has been described in language more or less specific to structural or methodical features. The term "comprises" and its variations, such as "comprising" and "comprised of" is used throughout in an inclusive sense and not to the exclusion of any additional features. It is to be understood that the invention is not limited to specific features shown or described since the means herein described comprises preferred forms of putting the invention into effect. The invention is, therefore, claimed in any of its forms or modifications within the proper scope of the appended claims appropriately interpreted by those skilled in the art.

Throughout the specification and claims (if present), unless the context requires otherwise, the term "substantially" or "about" will be understood to not be limited to the value for the range qualified by the terms.

Any embodiment of the invention is meant to be illustrative only and is not meant to be limiting to the invention. Therefore, it should be appreciated that various other changes and modifications can be made to any embodiment described without departing from the spirit and scope of the invention.

What is claimed is:

1. A suspension assembly comprising:
    a bushing;
    a spindle; and
    a cylindrical hinge member;
    wherein the bushing includes
        a sleeve body having a substantially cylindrical outer surface; and
        an inner bore of the sleeve body extending along a first longitudinal axis, the substantially cylindrical outer surface extending along a second longitudinal axis, said first longitudinal axis being eccentrically disposed with respect to the second longitudinal axis;
    wherein the inner bore of the sleeve body is adapted to engage the spindle and allow the cylindrical hinge member to rotate relative to the spindle;

wherein the substantially cylindrical outer surface of the sleeve body is adapted to engage an inner surface of the cylindrical hinge member;

wherein the bushing comprises a circumferential collar adapted for engagement with the cylindrical hinge member, the collar comprising a raised profile relative to the substantially cylindrical outer surface, and the substantially cylindrical outer surface of the sleeve body has an axial direction and extends axially away from the collar;

wherein the collar comprises one or more engagement portions for engaging and interlocking the collar relative to the cylindrical hinge member, the one or more engagement portions each comprising a projection extending away from the rest of the collar substantially in the axial direction of the substantially cylindrical outer surface of the sleeve body and in the same direction as the substantially cylindrical outer surface of the sleeve body extends away from the collar, and being circumferentially positioned relative to the substantially cylindrical outer surface of the sleeve body so as to be adapted for being positioned in a corresponding recessed portion of the cylindrical hinge member, and wherein the suspension assembly is an independent suspension assembly adapted to rotate relative to a trailer or a vehicle frame.

2. The suspension assembly in accordance with claim 1, wherein the cylindrical hinge member is a hollow cylindrical member.

3. The suspension assembly in accordance with claim 1, wherein the collar is adapted for engagement with hinge plates that are coupled to the trailer or vehicle frame.

4. The suspension assembly in accordance with claim 1, wherein each of the one or more engagement portions comprises one or more chamfered edges for engaging the cylindrical hinge member.

5. The suspension assembly in accordance with claim 1, wherein the collar comprises circumferentially or spirally arranged slots or grooves for allowing flow of lubricant there-along.

6. The suspension assembly in accordance with claim 1, wherein the inner bore comprises spirally arranged grooves extending along the internal surface of the inner bore, the spirally arranged grooves being provided for allowing flow of lubricant therethrough.

7. The suspension assembly in accordance with claim 1, wherein the bushing further comprises indicators for aligning the sleeve body relative to the cylindrical hinge member and/or the spindle and positioning the suspension assembly at a predetermined camber and/or toe.

8. The suspension assembly in accordance with claim 1, wherein the sleeve body comprises a first end and a second end such that the collar is located at one of said first or second ends for engagement with a connector attached to the trailer or vehicle frame and wherein the second end, during use, is adapted for being located within an internal volume defined by the cylindrical hinge member.

9. The suspension assembly in accordance with claim 1, wherein each of the one or more projections extends away from the rest of the collar, substantially in the axial direction of the substantially cylindrical outer surface of the sleeve body, a distance which is approximately equal to the thickness, in the axial direction of the substantially cylindrical outer surface of the sleeve body, of the rest of the collar.

* * * * *